US008270343B2

(12) United States Patent
Tardy et al.

(10) Patent No.: US 8,270,343 B2
(45) Date of Patent: Sep. 18, 2012

(54) BROADCASTING OF TEXTUAL AND MULTIMEDIA INFORMATION

(75) Inventors: Pierre Tardy, Toulouse (FR); Laurence Poirier-Clarac, Toulouse (FR)

(73) Assignee: Freescale Semiconductor, Inc., Austin, TX (US)

(*) Notice: Subject to any disclaimer, the term of this patent is extended or adjusted under 35 U.S.C. 154(b) by 1486 days.

(21) Appl. No.: 11/722,295

(22) PCT Filed: Dec. 20, 2004

(86) PCT No.: PCT/EP2004/014906
§ 371 (c)(1),
(2), (4) Date: Jun. 20, 2007

(87) PCT Pub. No.: WO2006/066617
PCT Pub. Date: Jun. 29, 2006

(65) Prior Publication Data
US 2009/0268648 A1   Oct. 29, 2009

(51) Int. Cl.
*H04W 4/00* (2009.01)
(52) U.S. Cl. ........ 370/328; 370/310; 370/473; 370/474; 725/37; 725/39; 725/40; 725/43; 725/48
(58) Field of Classification Search .................. 370/310, 370/328
See application file for complete search history.

(56) References Cited

U.S. PATENT DOCUMENTS

| | | | |
|---|---|---|---|
| 6,961,346 B1* | 11/2005 | Michalewicz et al. | 370/465 |
| 6,987,980 B1* | 1/2006 | Hans et al. | 455/466 |
| 7,447,986 B2* | 11/2008 | Kikuchi | 715/201 |
| 2001/0000194 A1* | 4/2001 | Sequeira | 725/39 |
| 2002/0078451 A1 | 6/2002 | Nishina et al. | |
| 2002/0156804 A1* | 10/2002 | Janakiraman et al. | 707/500.1 |
| 2002/0199148 A1* | 12/2002 | Krishnamachari | 714/752 |
| 2006/0085424 A1* | 4/2006 | Tung | 707/10 |
| 2006/0146853 A1* | 7/2006 | Paila | 370/428 |

FOREIGN PATENT DOCUMENTS

| | | | |
|---|---|---|---|
| GB | 2396444 A | * | 6/2004 |
| WO | 2004066652 A1 | | 8/2004 |
| WO | 2004084475 A1 | | 9/2004 |

OTHER PUBLICATIONS

ETSI EN 302 304, Digital Video Broadcasting (DVB); Transmission System for Handheld Terminals, 2004-2006.*
XP002326883; "Digital Video Broadcatsing (DVB); Transmission System for Handheld Terminals (DVB-H)".

(Continued)

*Primary Examiner* — Hassan Phillips
*Assistant Examiner* — Gautam Sharma

(57) ABSTRACT

A wireless communication system comprises a broadcast transmitter broadcasting textual and multimedia information to a remote receiver unit. The broadcast transmitter is operably coupled to a signal manipulation function and arranged to receive and process a broadcast signal that comprises both a textual portion and multimedia information. The signal manipulation function separates the textual and multimedia information into multiple bursts of data sub-blocks, wherein substantially each sub block comprises the textual data and a sub-block of multimedia information for transmitting to the remote receiver unit.

By implementing the aforementioned inventive concepts, faster access to the most important (i.e. semantic) part of the transmitted information can be obtained.

16 Claims, 3 Drawing Sheets

OTHER PUBLICATIONS

XP002326882; "IP Datacast Baseline Specification, PSI/SI Guidelines for IPDC DVB-T/H Systems".

Herrero, C. et al., "Delivering MHP applications into a real DVB-T network, Otadigi," Proceedings of the 6th IEEE International Conference on Telecommunications in Modern Satellite, Cable, and Broadcasting Services, Nis, Serbia and Montenegro, Oct. 1-4, 2003, pp. 231-234.

Nomura, Y. et al., "Requirements for Internet Media Guides," Dec. 2004, downloaded from <http://tools.ietf.org/html/draft-ietf-mmusic-img-req-07> on Oct. 22, 2010, 24 pages.

* cited by examiner

500

BROADCASTING OF TEXTUAL AND MULTIMEDIA INFORMATION

FIELD OF THE INVENTION

The preferred embodiment of the present invention relates to content delivery in data networks. The invention is applicable to, but not limited to, providing textual and multimedia data in the form of an electronic service guide (ESG).

BACKGROUND OF THE INVENTION

Present day data communication systems, both wireless and wire-line, have a requirement to transfer data between communication units. Data, in this context, includes many forms of communication such as speech, multimedia, signalling, etc. Typically, such data communication needs to be effectively and efficiently transported, in order to optimise use of limited communication resources.

Due to the recent growth in communications, particularly in Internet and wireless communications, there exists a need to provide improved data transfer techniques, where a particular quality of service of the transmitted data is often required or desired by the end user.

The European Telecommunication Standards Institute (ETSI) has defined a number of communication standards with the aim that a number of manufacturers are able to provide equipment that supports the same technology and are able to inter-operate with other equipment compliant with that standard. One such data communication standard developed by ETSI is the terrestrial digital video broadcasting (DVB-T) standard (ETSI EN 300 744), which has been developed for digital television sets and set-top boxes.

A recent variation of the DVB-T standard that has been adopted to incorporate enhanced features to allow improved reception of digital video broadcasting services for mobile devices is the digital video broadcasting-handset DVB-H standard. A DVB-H unit is battery powered, and the nature of the broadcast transmission offers a possibility to the DVB-H unit to repeatedly power off components/circuits of the DVB-H unit's receiver chain to increase battery usage. It is anticipated that DVB-H units may receive transmissions at a variety of locations, such as: indoor, outdoor, as a pedestrian, within a moving vehicle, etc.

One feature that has been incorporated within the DVB-H standard that facilitates this aim of mobile reception is the use of multi protocol encapsulated-forward error correction MPE-FEC of received data. MPE-FEC facilitates recovery of data by a receiver in situations of high data-packet loss, which can occur when a receiver is in a changing environment, for example when a receiver is moving. MPE-FEC regroups data into blocks (MPE-FEC frames) and performs forward error correction on these data blocks. For an efficient error correction mechanism, a common approach is to have MPE-FEC frames larger than 512 Kbits. Thus, a receiver operating within a DVB-H compatible system receives an MPE-FEC frame with up to 2 Mbit of data over a single channel in a relatively short time period, for example 200 millisecond.

To save power, the DVB-H standard has incorporated a technique of 'time-slicing'. Time slicing is a mechanism that regroups data into bursts. A burst is a quantity of data that is sent in a small amount of time. The next burst is sent after a significant time delay, and so on. During this period of time, bursts from other programs or applications are sent. In this manner, the receiver is only activated when there is a burst. Generally, within the DVB-H standard, bursts and MPE-FEC frames correspond. This means there are an integer number of complete MPE-FEC frames per burst.

It is known that a unidirectional delivery of data may be distributed between several logical channels, in order to enable receivers to more accurately specify the metadata (i.e. data that describes the content, condition of access and/or other characteristics of data) that the receivers are interested in. In this manner, a receiver needs only to access the logical channels of interest. Thus, the receiver is able to reduce an amount of time, storage and/or CPU resources needed for processing the data when a unidirectional delivery mechanism is used. Also, hierarchical channels enable receivers to subscribe to a, possibly well known, root multicast channel/group and progressively access only those additional channels.

Data carousel is a known mechanism that repetitively sends a set of data files over a data communication network. By repeating the transmission of data items/files within the set, any receiving communication unit needs only to receive the transmission over a single 'cycle', to ensure that each item of data is received. A server, generally located within the communication network, sends each file individually. Thus, when the server has sent the last file, the server then restarts sending the first file. This methodology has led to the common terminology of 'Data carousel'.

Thus, at the receiving side of a data network employing a data carousel methodology, there is no notion of a first and a last file as the transmission is cyclic. In this manner, in order to receive a file on one carousel, a user potentially has to wait for all of the files to arrive, in order to obtain a particular data file.

Therefore, the server transmits each file in the data carousel in turn and then restarts the transmission once a transmission cycle is complete. However, as the data content becomes richer, the size of files on the data carousel increases to such an extent that transmission time becomes excessive.

By way of explanation, in the context of data information relating to the world-wide-web (www), an item of information may be a document that may contain textual information and/or illustrations in the form of multimedia content. There are many instances where multimedia information on an information page is updated regularly, with the result that one or more data items are changed on the web page. In this context, the document generally needs to be sent every few seconds.

Furthermore, particularly in the context of web pages, a content provider typically wants their document to look attractive. Therefore, the content provider will often add multimedia content in the form of attractive images, flash movies, etc. The addition of such multimedia content significantly increases the size of the complete document, which can typically require up to several MBytes in current data systems. Therefore, there is a need to deliver large amounts of data content in an efficient manner.

In addition, in a wireless environment, bandwidth is expensive. Content Providers who provide electronic service guides (ESGs), such as television guides, do not want to allocate large amounts of bandwidth to the broadcasting of such documents.

In the art of data carousel networks, a paper by OtaDigi Herrero, C. Cesar, P. and Vuorimaa, P., published in the 6th International Conference on Telecommunications in Modern Satellite, Cable and Broadcasting Service, volume: 1, 1-3 Oct. 2003, discloses on pages: 231-234 an optimized carousel configuration technique. The proposed technique discloses a method whereby files required at a starting phase of a carousel operation are sent into the object carousel five times more often than a typical carousel operation. In particular, the paper discloses a mechanism of hierarchical data separation, with custom transport parameters, a custom repetition rate for the starting phase and caching of HTML EPG files for faster display.

Thus, a need exists for a mechanism, for example within a DVB-H receiving unit, to more efficiently deliver data content using a data carousel methodology.

STATEMENT OF INVENTION

In accordance with aspects of the present invention, there is provided a digital video broadcast unit, a digital video broadcast system, a method of digital video broadcasting and a protocol therefor are described as defined in the appended Claims.

BRIEF DESCRIPTION OF THE DRAWINGS

Exemplary embodiments of the present invention will now be described, by way of example only, with reference to the accompanying drawings, in which.

DESCRIPTION OF PREFERRED EMBODIMENTS

The preferred embodiment of the present invention will be described in terms of a digital video broadcast handset. However, it will be appreciated that the inventive concepts herein described may be embodied in any apparatus that incorporates time slicing (or similar bursts transmission mechanism) and would benefit from sending large amounts of data in a short time period, where different portions of the data are more suited to be delivered to a user more rapidly than other portions of data.

In contrast to the known art of carousel networks, the preferred embodiment of the present invention avoids wasting transmission bandwidth by implementing a scheme that separates the data content into presentation and semantic data. In particular, the preferred embodiment of the present invention utilises time-slicing and regroups the data into bursts. The preferred embodiment also utilises multiple-protocol encapsulation (MPE) and forward error correction (FEC), to efficiently transfer data files over a wireless interface. Generally, bursts and MPE-FEC frames correspond. This means there are typically an integer number of complete MPE-FEC frame per burst.

In summary, wireless communication system comprises a broadcast transmitter broadcasting textual and multimedia information to a remote receiver unit. The broadcast transmitter is operably coupled to a server 120 and arranged to receive and process a broadcast signal that comprises both a textual portion and multimedia information. The server 120 separates the textual and multimedia information into multiple bursts of data sub-blocks, where substantially each sub block comprises the textual data and a sub-block of multimedia information for transmitting to the remote receiver unit.

Notably, the preferred embodiment of the present invention takes account of the MPE-FEC frame size. Thus, the document to be transmitted is separated into a plurality of very small files, i.e. files of <512 kbits. In the particular context of the preferred embodiment, it is noteworthy that a maximum file size should be less than 2048 Kbits*0.5, according to ETSI standard: EN301 192 v1.4. section 9.5, which specifies the MPE-FEC maximum burst size as one of: 512 Kbits, 1024 Kbits, 1536 Kbits or 2048 Kbits.

Furthermore, the server 120 of the preferred embodiment of the present invention is adapted to reprogram the data carousel 118 to stream the respective data items in a more efficient manner. Additionally, a remote handset is adapted to receive such smaller file sizes and process the data accordingly. In processing the data, which results in faster semantic data updates, the information may be forwarded to a display of the DVB-H handset much faster.

Figure 1:
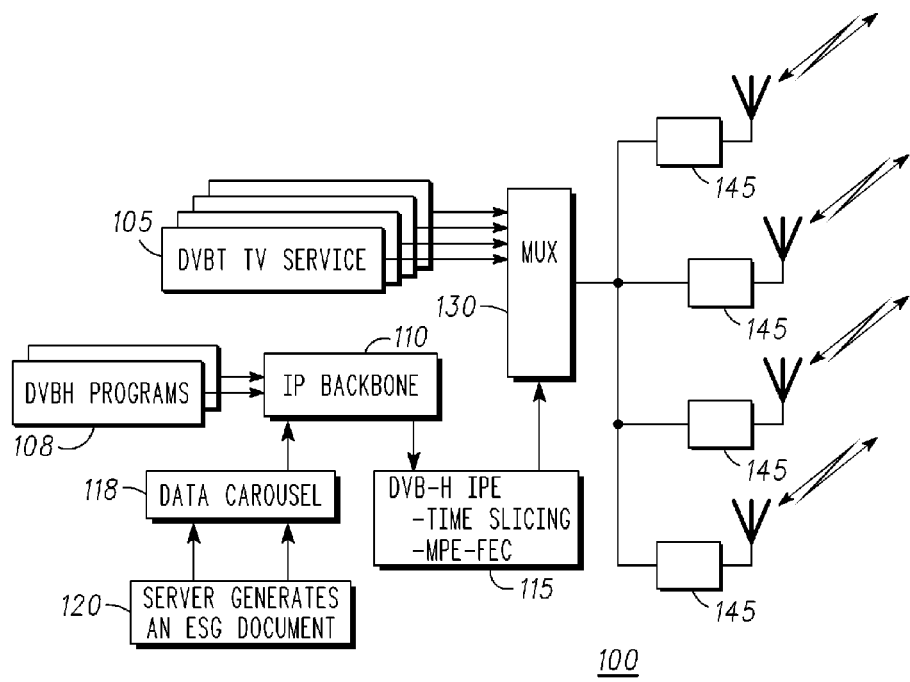
FIG. 1 illustrates a simplified block diagram of a digital video broadcasting system supporting DVB-H communication, adapted in accordance with the preferred embodiment of the present invention.

Referring now to FIG. 1, a simplified block diagram of a digital video broadcasting (DVB) communication system 100, supporting a handset mode (DVB-H) of operation is illustrated, in accordance with the preferred embodiment of the present invention. A set of ESGs (comprising a DVBT service) is multiplexed onto a link and fed to a number of wireless broadcast DVB-T terrestrial transmitters 145. The multiplexer 130 provides a fixed bit-rate for DVB-H channels.

In order to introduce DVB-H services into an existing DVB-Terrestrial network using a multiplexing approach, time-slice capable internet protocol (IP) encapsulators (IPE) 115 are connected to the multiplexer 130. Time-slice capable internet encapsulation is the filtering of IP datagrams of interest. These IP datagrams are encapsulated in the Transport stream (MPEG2-TS). These encapsulated IP datagrams are then transmit only during the time interval corresponding to the service allocated for the time slice.

The multiplexer is ideally located in each coverage area and contains a fixed amount of bit-rate that is reserved for DVB-H services. The multiplexer is preferably upgraded to provide better DVB-H support using, for example, smoothing of re-inserted Program Service Information (PSI)/Service Information (SI) tables and management of the Internet Protocol/Medium Access Layer (MAC) Notification (INT) table. PSI/SI tables are DVB-T signalling tables used to transmit information, for example Program identifiers, stream types. An INT table is also a signalling table indicating, inter-alia, an IP Platform identifier and an IP address for the elementary stream mapping used. Notably, the number of multiplexers determines the granularity of service coverage areas. This is a primary reason why these multiplexers are ideally located locally in each coverage area (either a multiple frequency network (MFN) or a single frequency network (SFN)).

Advantageously, for network-wide distribution of IP data streams, including DVB-H programs 108, the IP streams can be received from an IP backbone 110 and encapsulated centrally, within the DVB-H IPE 115. The encapsulated IP stream is then distributed to the broadcast transmitter sites 145 within a centrally produced transport stream, via the multiplexer 130.

In an alternative embodiment of the present invention, it is envisaged that use of time-slicing to broadcast semantic data more regularly may be avoided. If capacity exists in the transport stream distribution network, the available capacity may be used instead of a time-slicing approach. In this manner, it is envisaged that the centrally encapsulated IP data streams may simply be embedded in the transport stream using normal multi-protocol encapsulation.

The local IP encapsulator in the DVB-H handset would then be configured to decapsulate these received IP data streams. If the DVB-H handset receives non time-sliced data, it only transmitted them continuously to the IP network layer. In a case of the reception of time-sliced burst of data, some buffering will be required in order to transmit a continuous IP flow to the applications. Aspects of the DVB_H handset operation are further described below, with respect to FIG. 2 and FIG. 3.

In the preferred embodiment of the present invention, a data carousel 118 is used for the transmission of metadata, and in some case for the download of application-type data files. For other types of data, it is envisaged that some IP streaming transport delivery protocols over IP may be used. In the preferred embodiment of the present invention, metadata (ESG) IP flow is multiplexed with other IP data flows and also in some instances with SI/PSI tables and DVB-T MPEG TV Data Service flows.

Thus, the carousel server configures a broadcast signal to comprise at least one complete semantic file in each burst/MPE-FEC frame, and to fill the available space with presentation data, noting that MPE-FEC frames should be at least 512 kbits. The preferred protocol employed with the data carousel of the server is a one-way protocol, such as a file Delivery over Unidirectional Transport (FLUTE) (RFC 3926), as standardised by the Reliable Multicast Transport working group (IETF, and described at http://www.ietf.org/rfc/rfc3926.txt. FLUTE is a protocol for the unidirectional delivery of files over the Internet, which is particularly suited to multicast networks and has been adapted here to facilitate formation and transport of data as further described below.

Figure 2:
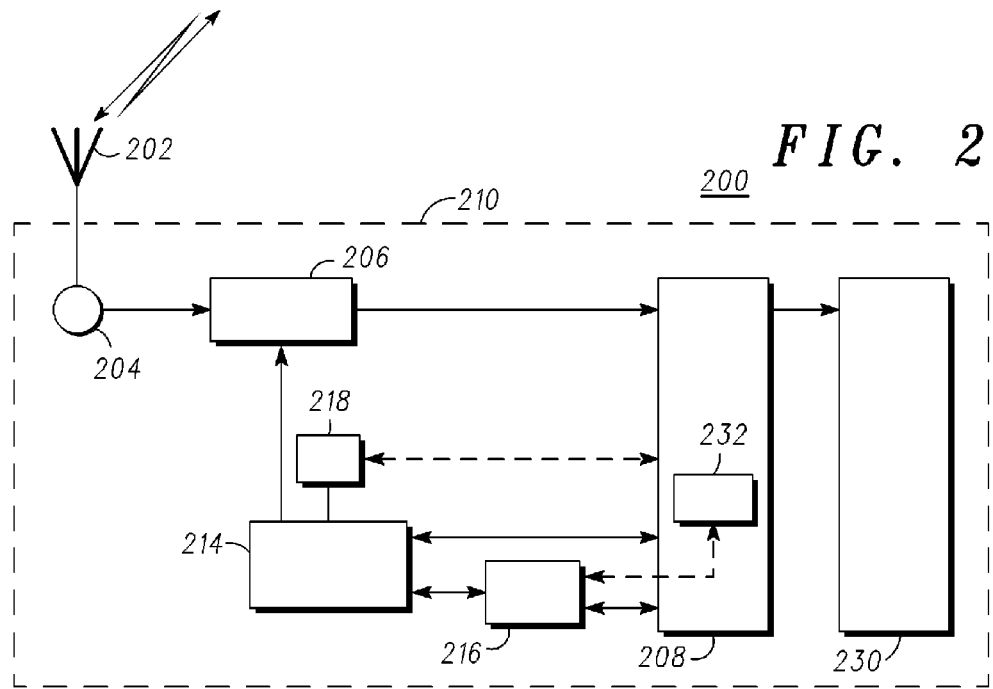
FIG. 2 illustrates a simplified block diagram of a wireless digital video broadcasting handset (DVB-H) unit, adapted in accordance with the preferred embodiment of the present invention.

Referring now to FIG. 2, there is shown a block diagram of a wireless DVB-H receiving unit 200 adapted to support the inventive concepts of the preferred embodiments of the present invention. The wireless DVB-H receiving unit 200 contains an antenna 202 preferably coupled to a radio frequency filter 204 that filters out undesired received radio frequency signals within the wireless DVB-H unit 200. As known in the art, the receiver chain 210 typically includes receiver front-end circuitry 206 (effectively providing one or more of the following: further filtering, signal amplification, intermediate or base-band frequency conversion). The receiver front-end circuitry 206 is serially coupled to a signal processing function 208. An output from the signal processing function 208 is provided to a user-interface 230, which comprises a display and may comprise other output devices such as a loudspeaker, etc.

The receiver chain 210 also includes a controller 214 for maintaining overall communication/signal control of the DVB-H unit 200. The controller 214 is also coupled to the receiver front-end circuitry 206 and the signal processing function 208 (generally realised by a digital signal processor (DSP)). A skilled artisan will appreciate that many other signal manipulation circuits/elements/components may be used to implement the inventive concepts described herein.

The controller 214 may therefore receive bit error rate (BER) or frame error rate (FER) data from decoded signals. The controller 214 is coupled to a memory device 216 for storing operating regimes, such as decoding/encoding functions and the like, as well as DVB-H specific data. A timer function 218 is typically coupled to the controller 214 to control the timing of operations (transmission or reception of time-dependent signals) within the wireless DVB-H unit 200.

The timer 216, in conjunction with the signal processing function 208 or controller 214, is configured to properly synchronize the receiver operation to transmissions from the DVB-T broadcast transmitters. Alternatively, it is envisaged that the timer 218 may use a common universal time reference. A preferred example of a common universal time reference is global positioning system (GPS).

In accordance with the preferred embodiment of the present invention, the signal processing function 208 has been adapted to comprise a signal manipulation function 232 that utilises the time-slicing and MPE-FEC technologies available in receiving a DVB-H transmission. Notably, the signal processing function 208 takes account of the MPE-FEC frame size. Thus, the signal manipulation function 232 separates the received document into a plurality of very small files, i.e. files of <512 kbits. The very small files are then actioned, i.e. processed and displayed, resulting in a much faster update rate of semantic information, as compared to know DVB-H units. This operation is further described with respect to FIG. 3.

Figure 3:
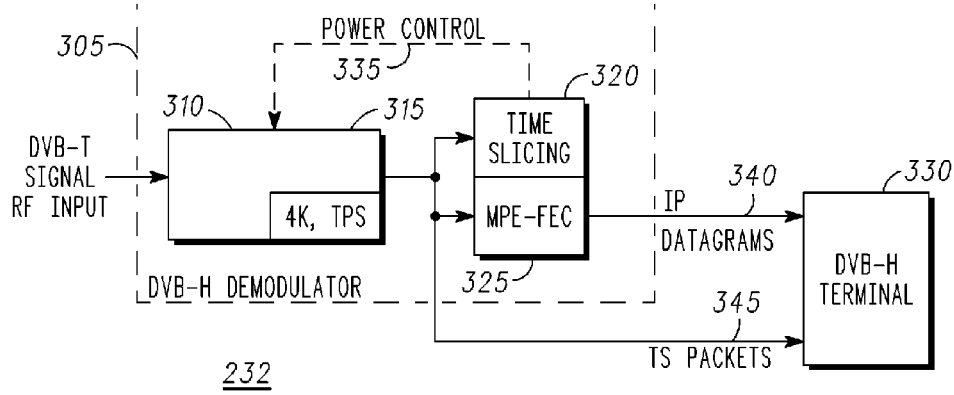
FIG. 3 illustrates a more detailed block diagram of the DVB-H functions of the DVB-H handset unit, adapted in accordance with the preferred embodiment of the present invention.

Referring now to FIG. 3, a more detailed block diagram of the signal processing aspects of the DVB-H handset unit is illustrated, where the DVB-H unit is adapted in accordance with the preferred embodiment of the present invention. The DVB-H unit receives radio frequency signals from, say, one of the wireless DVB-T transmitters 145 of FIG. 1. The DVB-H unit comprises wireless functionality and components (not shown) that process and down-mix received DVB-H signals, as described above with respect to FIG. 2.

A signal manipulation function 232 comprises a DVB-H demodulator 305. A resulting signal 310 input to the signal processor is a DVB-T signal. The resulting signal is input to a DVB-T demodulator function 315, designed in accordance with the ETS 300 744 standard, where it is demodulated into a data stream according to one of three transmission modes 8 k, 4 k or 2 k, with associated transmitter parameter signalling (TPS). In essence, the DVB-T demodulator 315 recovers the MPEG-2 transport stream packets from the received DVB-T RF signal.

The demodulated signal is input to a time slicing function 320, which provides a feedback power control loop 335 to the DVB-T demodulator 315 to save receiver power consumption whilst enabling the DVB-H unit to perform a smooth and seamless frequency handover from MPEG2 to DVB-H frequencies. The demodulated signal is also input to an MPE-FEC frame manipulation function 325, which provides a complementary forward error correction mechanism for the received DVB-H data, thereby allowing the receiver to operate in difficult receiving conditions.

The demodulated signal also outputs time synchronisation (TS) packet data 345 to another portion of the signal processor 208 (termed the DVB-H terminal) 330 to enable the IP datagrams 340 output from the MPE-FEC frame manipulation function 325 to be correctly processed. The DVB-H terminal 330 receives IP datagrams and filters them using the IP Network Layer and some transport protocols, such as FLUTE, to separate data flow such as audio and video streams from metadata such as ESG data. In the context of the present invention, semantic data is also separated from presentation data, with such data finally processed and reassembled and offered within the service to the end-user. On the control side, the DVB-H terminal 330 is also used to select the IP platform of interest and to indicate, to the demodulator, the associated frequencies to scan.

In operation, a DVB-H handset receives both traditional MPEG2 services and time-sliced DVB-H services carried over the same multiplexed signal communication path. The time-sliced DVB-H services comprise a first ESG document. The DVB-H handset is arranged to process the first ESG document, which is the semantic extended mark-up language (xml) file. In processing the first xml file, the DVB-H handset has references to presentation data. If such presentation data is not already stored in memory/cache (i.e. these files have not been downloaded previously), the DVB-H handset effectively downloads further files and starts to display only the processed text. In this manner, the user is able to read the rapidly received and displayed text, and thereafter respond to it {for example use the information to watch interesting DVB-H content, such as TV channels}.

After receiving the first burst, the receiver progressively downloads and processes subsequent ESG documents from subsequent bursts. The ESG documents are typically in an extended mark-up language (xml) format, and are sent using a 1-way protocol, typically referred to as a 'flute' protocol. The 1-way protocol in the preferred embodiment of the present invention utilises a data carousel (not shown). Furthermore, in the preferred embodiment of the present invention, it is envisaged that each xml file may be the responsibility of a different operator, with the broadcaster controlling the flute session to combine separate ESGs.

The display is thus updated as each new image/picture is received, in a similar manner to web browsers.

Xml files are primarily text-based and in binary format. Hence, xml files require little space, for example semantic data is of the order of approx. 50 kbits. All such files are preferably sent in one flute session, in a single time-slice slot, together with associated parameters. In this manner, parameters may be set properly to ensure that at least one semantic block of data is in each burst, where the parameters include the semantic transmission rate and the presentation transmission rate. This leads into the formula T<Bs/Cb, as described below. ESG xml files are typically sent every two seconds. A whole ESG document may be of the order of 5.12 Mbits. A burst is sent every 4 seconds, i.e. 512 Kbits per burst.

Thus, in operation, it is envisaged that the signal manipulation function 232 of the DVB-H unit may be configured to process and instantly display the demodulated semantic data. Alternatively, the signal manipulation function 232 of the DVB-H unit may be configured to process the demodulated semantic and presentation data and cache (say, in memory element 216 of the DVB-H unit of FIG. 2) the static presentation data). Thus, this concept focuses on the avoidance of caching fast changing semantic data.

By implementing the preferred embodiment of the present invention, ESG semantic files may then be updated (and displayed) in approximately four seconds. A complete set of the presentation data/media files is received:

$$\frac{5120}{(512-50)} \times 4 = \text{approximately 44 seconds later}$$

To clarify how a document is to be processed and partitioned, let us assume the following:
The parameters of the time-slicing generator are:
(i) The size of the burst-Bs Kbit;
(ii) The available bandwidth for broadcasting the information-Cb (in Kbits per second)
An associated parameter of the Data Carousel generator is that the semantic data is sent every T sec By definition, with these time slicing parameters, we have a burst every $$\frac{Bs}{Cb}$$

seconds.

Then, in order to have at least one semantic block of data in each burst we must ensure that:

$$T < \frac{Bs}{Cb}$$

Thus, if $$T < 0.5 \cdot \frac{Bs}{Cb};$$

there are two Semantic instances in one burst, with at least one where a complete burst comprises semantic data.

Figure 4:
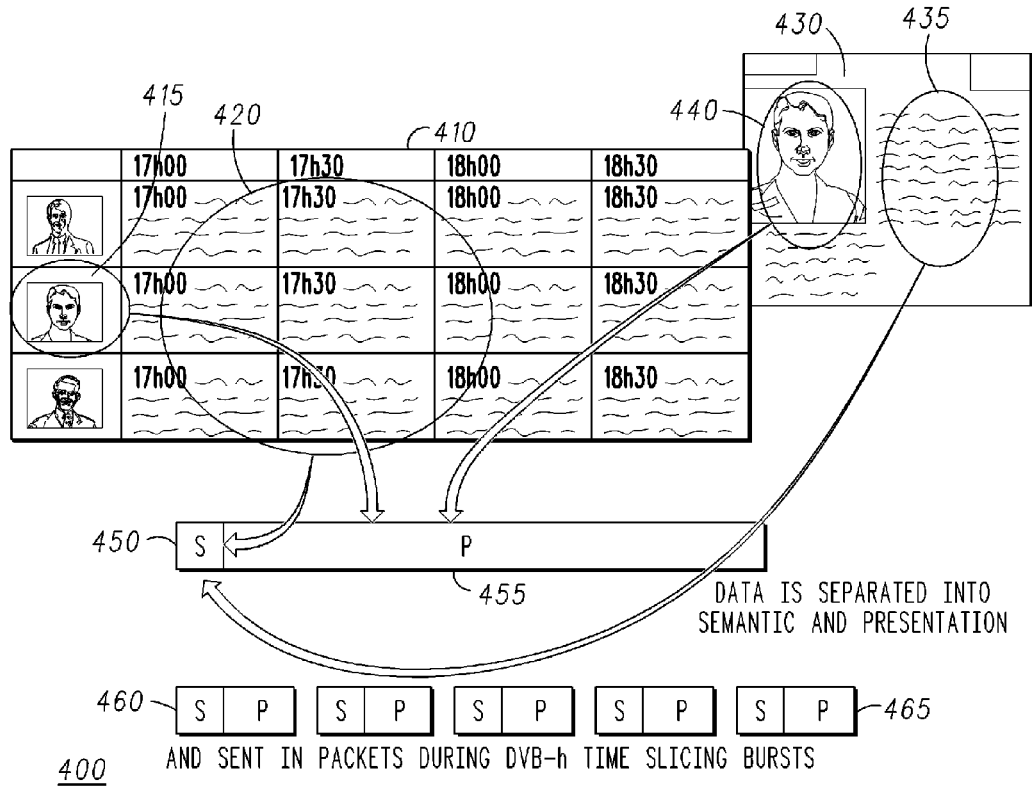
FIG. 4 illustrates a mechanism of separating data items in accordance with the preferred embodiment of the present invention.

Referring now to FIG. 4, a schematic diagram 400 of the preferred methodology of the present invention is illustrated. As shown, the preferred methodology works with any text and multimedia-type data such as an ESG document or most web-pages. An Operator decides to transmit a document, for example a multimedia page that contains Semantic data and Presentation data (or similar). FIG. 4 illustrates two examples of a document, such as an ESG 410 or a web-page 430. The ESG 410 comprises textual information in the form of semantic data 420, as well as non-textual information 415, which for the purposes of the present invention can be understood as being presentation data 415. Similarly, the web page 430 to be broadcast digitally comprises textual information 435 as well as non-textual information 440, say, in the form of multimedia video. The multimedia video data can be understood as being presentation data in the context of the present invention.

As described previously, a processor in the server is arranged to divide the document (say the ESG 410 or web page 430) to be broadcast into two distinct data elements, namely:

(i) Semantic data 420, 435. These data items are lightweight and are auto-sufficient, i.e. with these data items it is possible to display an un-enlightened version of the information. Thus, it is envisaged as being a responsibility of the person who implements the system to display the semantic data as best as (s)he can, noting that the graphical data cannot be displayed until it is received and processed. One simple way may be to display a text-only version of the raw information, or display it in a table sorted by date and hour, or by TV channel or by theme. It is envisaged that any one of these options may be used with semantic data only; and (ii) Presentation and/or graphical data 415, 440. These data items are generally used to provide a more attractive version of the information to be displayed, for example, multimedia illustrations. Such data items are memory, processing and bandwidth intensive.

Thus, the inventors of the present invention have recognised, appreciated and utilised the fact that Semantic data is likely to change quite often, whereas presentation data is more stable and static. Furthermore, semantic data is more critical for the user than presentation data, as semantic (TV-related) data is essential and sufficient to begin watching TV whereas presentation data is provided to make the DVB-H guide more attractive. Therefore, as semantic data is more important to the user than presentation data, the preferred embodiment of the present invention ensures that Semantic data is uploaded more frequently. Hence, the user is able to access the Semantic data in a much shorter time period than current data techniques.

Thus, the data that is to be broadcast is received and processed into a single data block comprising Semantic data 450 followed by presentation data 455. The single data block is then partitioned into separate, distinct and smaller data blocks. Each of the separate distinct and smaller data blocks comprises Semantic data and a plurality of much smaller items of presentation data. Thus, Semantic data 460 is broadcast more regularly as time-sliced blocks, each preferably broadcast with smaller portions of the total presentation data 465 being broadcast. The server processor associated with the data carousel has therefore been adapted/re-programmed to stream the Semantic data more regularly than known data carousel networks, with Semantic data being broadcast say, every T sec. Furthermore, the server is configured to partition a presentation data block and insert sub-portions of the Presentation data into the remaining sections of the data stream, as illustrated in FIG. 4.

Figure 5:
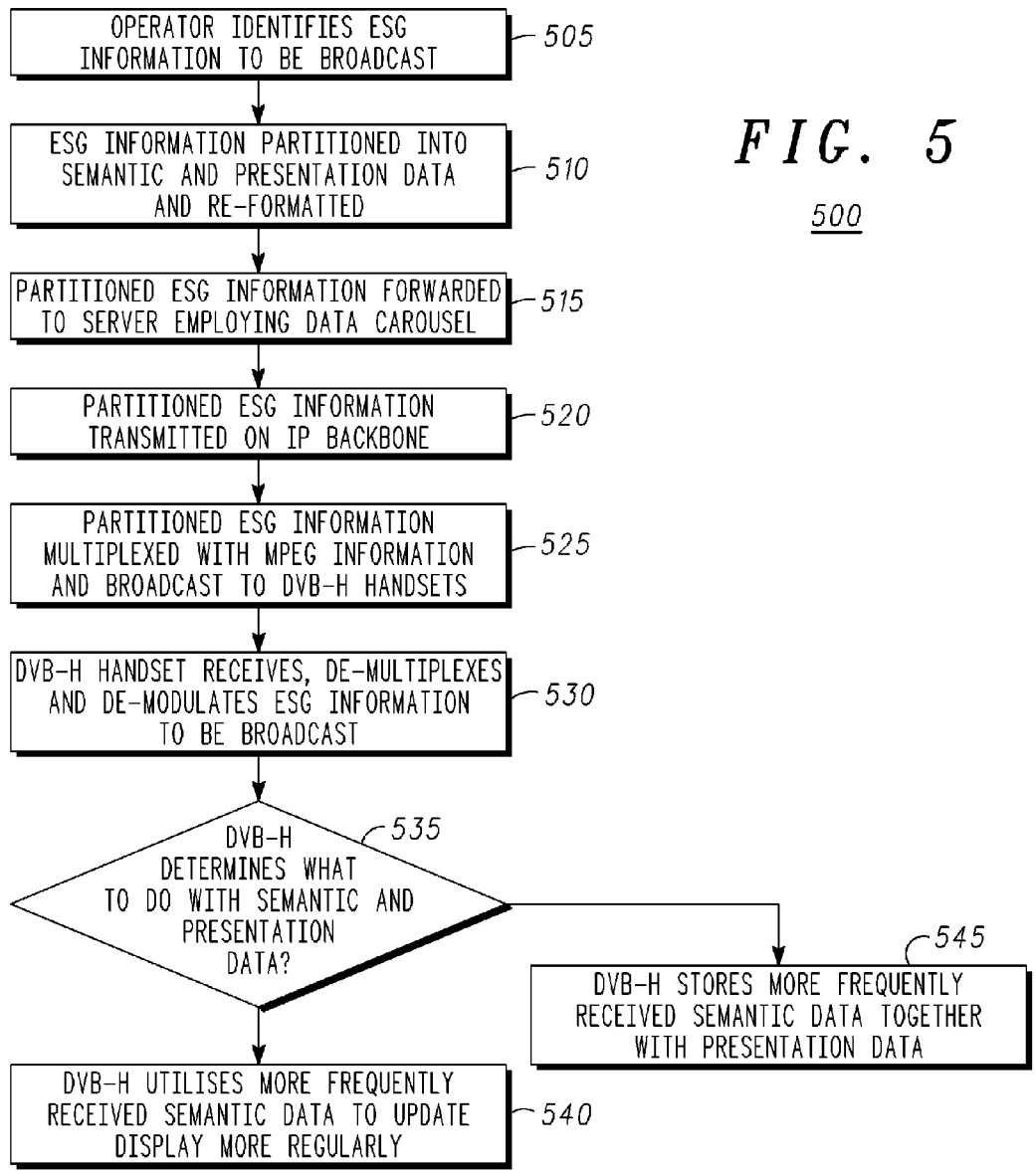
FIG. 5 is a flowchart illustrating a mechanism of digital video broadcasting in accordance with the preferred embodiment of the present invention.

Referring now to FIG. 5, a flowchart 500 illustrates, in summary, the preferred mechanisms employed in the present invention. An Operator (or similar service provider) identifies textual and multimedia information to be broadcast, for example semantic and presentation data within electronic service guide (ESG) information, in step 505. ESG information is then partitioned into semantic and presentation data and re-formatted, as shown in step 510 and described previously. In this manner, the presentation data is separated into small file sizes and semantic data included with each of these smaller file sizes.

The partitioned ESG information is then forwarded to a server of the DVB-T system that employs a data carousel, as in step 515. The partitioned ESG information is then transmitted on an IP backbone, in step 520 and multiplexed with MPEG information in step 525. The multiplexed information is then sent to, and broadcast from, wireless DVB-T transmitters to DVB-H handsets, as shown in step 525.

A DVB-H handset then receives, de-multiplexes and demodulates the broadcast transmission, in step 530, and determines how to handle the demodulated and separated semantic and presentation data in step 535. The DVB-H handset then either displays the updated semantic (and possibly presentation data) immediately, in step 540, or stores the updated information to be displayed subsequently, as shown in step 545.

In this manner, a DVB-H unit employing the preferred embodiment of the present invention facilitates a user in being able to receive updated semantic data upon receiving each burst. Whilst downloading semantic data, it is preferred that the data is displayed in a text only manner. Thus, in an enhanced embodiment of the present invention, the user is then preferably provided with the capability of downloading subsequent presentation multimedia data, in response to rapidly received, processed and displayed semantic data.

Advantageously, if the user solely wants updated information, the user just has to wait for a single burst to be received and processed to identify what the updates are. The user only has to wait a slightly longer time if some of the presentation data changes.

Thus, a communication protocol for broadcasting textual and multimedia information in a wireless communication system is provided. The communication protocol comprises a broadcast signal having both a textual portion and multimedia information partitioned into multiple bursts of data sub-blocks, where substantially each data sub block comprises the textual data and a sub-block of multimedia information for transmitting to a remote receiver unit. The communication protocol preferably comprises time slicing of the textual and multimedia information into multiple bursts in order to send the data sub-blocks in time sliced bursts.

Although the preferred embodiment of the present invention is described with reference to a DVB-H unit using MPE-FEC and time slicing technologies, it is envisaged that the inventive concepts are equally applicable to other data communication systems and technologies where a combination of textual and non-textual information is typically sent together, but can be separated and re-broadcast in distinct and smaller portions, with the textual information sent in each of the smaller portions. In this manner, updated textual information is broadcast more regularly.

Furthermore, although the preferred embodiment discloses a mechanism whereby data sub-blocks are separated and re-formulated into textual data and a sub-block of multimedia information, it is envisaged that, in some instances, a substantial portion of the whole block of textual data may be transmitted, processed and received, i.e. some extraneous data bits (not classified as presentation data per se) may fall within a definition of semantic data and yet be communicated and processed differently.

It will also be appreciated by a skilled artisan that although the above concepts have been described with reference to a transmission of ESG data to a DVB-H handset user, to allow the user to be aware of the different services accessible through DVB-H, it is envisaged that the inventive concepts are not limited to such technologies. Indeed, the inventive concepts are applicable to any device or communication system that is capable of supporting simultaneous broadcasting of textual and multimedia information.

It is within the contemplation of the present invention that the inventive concepts are able to complement the DVB-H standard. It is also envisaged that the inventive concepts can be used within future broadcasting standards, including website broadcasting.

It will be understood that the wireless communication unit, wireless communication system and method of processing data therein, as described above, aim to provide at least one or more of the following advantages:
  (i) Faster access to the most important (semantic) part of the transmitted information. By implementing the inventive concepts, the average access time is reduced substantially;
  (ii) Successful uptake of DVB-H requires the ability to transmit large files efficiently, thereby allowing the system to provide customized video-on demand to large number of customers simultaneously, enhanced by the inventive concepts herein described;
  (iii) A primary benefit is in the improved user experience (end product performance, value);
  (iv) The inventive concept maintains a fast access to information updates, for example within an ESG; and
  (v) The inventive concept maintains a low bandwidth occupation.

In particular, it is envisaged that the aforementioned inventive concepts can be applied to a large number of receiver architectures and platform solutions, i.e. a semiconductor manufacturer may employ the inventive concepts in a design of a stand-alone signal processor or application-specific integrated circuit (ASIC) and/or any other sub-system element.

Whilst the specific and preferred implementations of the embodiments of the present invention are described above, it is clear that one skilled in the art could readily apply variations and modifications of such inventive concepts.

Thus, a digital video broadcast unit, a digital video broadcast system, and a method of digital video broadcasting and a protocol have been described, where the aforementioned disadvantages with prior art arrangements have been substantially alleviated.

The invention claimed is:

1. A wireless communication system comprises:
a broadcast transmitter operable to broadcast a text file comprising textual information, and multimedia information to a remote receiver unit; and
a server operably coupled to the broadcast transmitter,- wherein the server is arranged to:
receive the text file and the multimedia information;
store the text file as a single textual data block including the textual information;
separate the multimedia information into multiple multimedia data sub-blocks, each multimedia data sub-block including a portion of the multimedia information; and
provide the single textual data block and the multimedia data sub-blocks to the broadcast transmitter in multiple time-sliced packets for broadcasting to the remote receiver unit, each time-sliced packet comprising the single textual data block and one or more multimedia data sub-blocks.

2. The wireless communication system of claim 1, wherein the server is further operably coupled to a multiplexer arranged to multiplex the time-sliced packets within broadcast information of MPEG television signals.

3. The wireless communication system of claim 1, wherein the textual information is semantic information and the multimedia information is presentation information.

4. The wireless communication system of claim 1, the textual information and the multimedia information are transmitted as part of an electronic service guide.

5. The wireless communication system of claim 1, wherein the textual information and the multimedia information are broadcast as part of digital video broadcast transmission.

6. The wireless communication system of claim 1, wherein the server is further operably coupled to a data carousel arranged to cyclically transmit the time-sliced packets.

7. The wireless communication system of claim 1, wherein the remote wireless communication unit further comprises a signal manipulation circuit operable to receive, separate and process the textual information and the multimedia information from the multiple time-sliced packets and extract multiple textual data blocks.

8. A wireless communication unit comprises: a receiver operably coupled to a signal manipulation circuit and operable to receive and process a text file comprising textual information and multimedia information, wherein the receiver receives multiple time-sliced bursts of data sub-blocks and the signal manipulation circuit processes each time-sliced burst of data sub-blocks such that each data sub-block includes a single textual data block that includes all of the textual information of the text file: and also includes one or more multimedia sub-block that each include a portion of the multimedia information.

9. The wireless communication unit of claim 8, wherein the signal manipulation circuit further operates to process time-sliced data sub-blocks.

10. A method of broadcasting a text file comprising textual information and multimedia information to a remote receiver unit in a wireless communication system, the method comprising the steps of:
receiving the text file and the multimedia information;
storing the text file as a single textual data block including the textual information;
partitioning the multimedia information into multiple multimedia data sub-blocks, each multimedia data sub-block including a portion of the multimedia information; and
providing the single textual data block and the multimedia data sub-blocks to a broadcast transmitter in multiple time-sliced packets for broadcasting to a remote receiver unit.

11. The method of broadcasting textual information and multimedia information of claim 10, further comprising the step of time slicing the textual information and the multimedia information into multiple bursts in order to send the data sub-blocks in time sliced bursts.

12. The method of broadcasting textual information and multimedia information of claim 10, further comprising the step of multiplexing the time-sliced data sub-blocks within broadcast information of MPEG television signals.

13. The method of broadcasting textual information and multimedia information of claim 10, wherein the step of partitioning further comprises partitioning the textual information in a form of semantic information and the multimedia information in a form of presentation information.

14. The method of broadcasting textual information and multimedia information of claim 10, wherein the textual information and the multimedia information are transmitted as part of an electronic service guide.

15. The method of broadcasting textual information and multimedia information of claim 10, further comprising the step of cyclically transmitting the multiple bursts of data sub-blocks.

16. The method of broadcasting textual information and multimedia information of claim 10, wherein a signal manipulation circuit is operably coupled to a multiplexer arranged to multiplex the multiple bursts of data sub-blocks with MPEG television signals.

* * * * *